(12) United States Patent
Yasui et al.

(10) Patent No.: US 6,537,376 B1
(45) Date of Patent: Mar. 25, 2003

(54) COATING DEVICE

(76) Inventors: Yoshinari Yasui, Atsugi factory of Yasui Seiki Co., Ltd. 148-1, Kadosawabashi, Ebina-shi, Kanagawa (JP); Takashi Iwasaki, Atsugi factory of Yasui Seiki Co., Ltd. 148-1, Kadosawabashi, Ebina-shi, Kanagawa (JP)

( * ) Notice: Subject to any disclaimer, the term of this patent is extended or adjusted under 35 U.S.C. 154(b) by 1670 days.

(21) Appl. No.: 08/563,156

(22) Filed: Nov. 27, 1995

Related U.S. Application Data

(63) Continuation of application No. 08/811,844, filed on Aug. 25, 1993, now abandoned.

(30) Foreign Application Priority Data

Dec. 28, 1992 (JP) ............................................... 4-348134

(51) Int. Cl.⁷ ................................................ B05C 3/02
(52) U.S. Cl. ....................................... 118/411; 118/419
(58) Field of Search .......................... 425/461; 118/410, 118/411, 419, 413, 300, 315, 313; 239/553.3, 566, 590, 590.3, 597

(56) References Cited

U.S. PATENT DOCUMENTS

| | | | | |
|---|---|---|---|---|
| 2,526,991 A | * | 10/1950 | Biddle | 118/412 |
| 3,825,645 A | * | 7/1974 | Fayet | 425/461 |
| 3,995,581 A | * | 12/1976 | Smejde | 118/412 |
| 4,017,240 A | * | 4/1977 | Nelson | 425/461 |
| 4,106,437 A | * | 8/1978 | Bartlett | 118/412 |
| 4,142,010 A | * | 2/1979 | Pipkin et al. | 425/461 |
| 4,324,816 A | * | 4/1982 | Landis | 118/411 |
| 4,475,478 A | * | 10/1984 | Berdinner, Jr. et al. | 118/413 |
| 4,708,629 A | * | 11/1987 | Kasamatsu | 118/411 |
| 4,756,271 A | * | 7/1988 | Maier | 110/411 |
| 5,072,688 A | * | 12/1991 | Chino | 118/419 |
| 5,145,528 A | * | 9/1992 | Watanabe et al. | 118/411 |
| 5,188,789 A | * | 2/1993 | Nishiura | 118/411 |
| 5,334,247 A | * | 8/1994 | Columbus et al. | 118/411 |

\* cited by examiner

*Primary Examiner*—Brenda A. Lamb
(74) *Attorney, Agent, or Firm*—Charles N. Quinn, Esq.

(57) ABSTRACT

A coating device for applying a coating to a surface of a travelling continuous substrate by discharging it from a nozzle extending in a widthwise direction of the substrate. In the coating device, a plurality of discharge openings are arranged in a row at predetermined distances spaced apart from one another in a longitudinal direction of the nozzle. A flat surface is formed on at least a portion, of a tip end of said nozzle opposed to the substrate, which lies at a downstream side in a travelling direction of the substrate. The flat surface is adapted to permit the uniformization of the thickness of the coating discharged from the plurality of discharge openings onto the substrate. Thus, the coating can be applied widthwise uniformly onto the substrate with the aid of the flat surface. In addition, it is possible to reliably prevent the deformation of the discharge openings.

8 Claims, 5 Drawing Sheets

COATING DEVICE

This is a continuation of application Ser. No. 08/811,844, filed Aug. 25, 1993, now abandoned.

BACKGROUND OF THE INVENTION

1. Field of the Invention

The present invention relates to a coating device for applying a coating material such as a magnetic solution, a sensitizing solution and a paint to a wide substrate of resin, paper, cloth, metal or the like.

2. Description of the Prior Art

In general, various coating devices are used to continuously apply various coatings to a continuous substrate of resin film, paper, cloth, metal or the like.

Such coating devices for applying a coating to such a substrate, which have been used, include a variety of coating devices such as a roll type coating device, a gravure coating device, an extrusion type coating device and the like. The present invention is directed to a coating device designed to discharge a coating under a proper pressure from a slit in a coating head, as is the extrusion type coating device or the like.

A coating device of such a type has a coating head suitable for a substrate having a width, for example, on the order of 0.5 to 3.0 m, so that a desired coating is discharged under a proper pressure from the slit in the coating head and applied to the substrate in such a manner that the coating head is pushed against the travelling substrate.

In such a coating device, the following problem is encountered, because the coating is discharged under the proper pressure from the slit defined in the coating head. Also because of the viscosity of the coating, the opening width of the slit at a longitudinal central point may be increased to a value larger than those at opposite ends and as a result, the widthwise thickness of the coating applied to the substrate is not uniform, thereby bringing about a reduction in coating accuracy such as an irregularity of thickness of the coating.

In order to overcome such problem, a coating device has been proposed in which the coating accuracy is enhanced by adjusting the opening width of the slit, as disclosed in Japanese Patent Application Laid-open No. 56272/90.

In the prior art coating device disclosed in Japanese Patent Application Laid-open No. 56272/90, however, a reservoir 3 is provided within the coating device 1 and connected to a coating supply port 2. The reservoir 3 has a widthwise dimension L corresponding to the width of a substrate 4 (FIG. 2). A slit 5 is defined by a back block 6 and a doctor block 7 for discharging a coating over the widthwise dimension. A yoke 8 and a screw 9a as a biasing/adjusting member attached to the yoke 8 are mounted on an outer peripheral wall of a side surface of the doctor block 7. The yoke 8 is mounted on an outer wall surface of the coating device 1, as shown in FIG. 10, and fixed by a screw 11a at an acting portion 11 closer to a tip end 10, and an adjusting portion 9 is provided at a yoke end remotest from the tip end 10 for applying a force to the acting portion 11. The screw 9a is disposed in the adjusting portion 9, so that the magnitude of the opening width t of the slit 5 can be adjusted by adjusting the screw 9a. The, yoke 8 is fastened at its vertically substantially central portion by a screw 12a to come into contact with to the side wall, but unlike the acting portion 11, the screw 12a need not necessarily firmly fix the central portion, and has a positioning effect, so that the central portion serves as a fulcrum 12 for the action of a lever.

Therefore, the operatability of adjusting the magnitude of the opening width t of the slit 5 for discharging the coating can be enhanced, but it is still necessary to adjust the longitudinal (in the widthwise direction of the substrate) magnitude of the opening width t of the slit 5, resulting not only in reductions in operatability and maintenance property, but also in a problem that a limitation in design of the structure of the coating device 1 is imposed and a problem of an increased economic burden.

A hot melt system comprising the heating of a coating to apply the coating suffers from a problem that the back block 6 and the doctor block 7 may be heated, so that they are liable to be deformed, and the clearance t is liable to be varied.

Accordingly, it is an object of the present invention to provide a coating device wherein the problems associated with the prior art can be overcome, and a coating can be applied widthwise uniformly on a substrate.

SUMMARY OF THE INVENTION

To achieve, the above object, according to the present invention, there is provided a coating device for applying a coating to a surface of a travelling continuous substrate by discharging it from a nozzle extending in a widthwise direction of the substrate, comprising a plurality of discharge openings arranged in a row at predetermined distances spaced apart from one another in a longitudinal direction of the nozzle, and a flat surface formed on at least a portion, of a tip end of the nozzle opposed to the substrate, which lies at a downstream side in a travelling direction of the substrate, the flat surface being adapted to permit the uniformization of the thickness of the coating discharged from the plurality of discharge openings onto the substrate.

In the coating device according to the present invention, the discharge openings may be arranged in multiple rows, so that a plurality of coatings can be applied in a superposed manner onto a surface of a travelling continuous substrate.

With the coating device having the above construction according to the present invention, the coating can be discharged onto the substrate from the plurality of discharge openings arranged in a row at the predetermined distances spaced apart from one another in the longitudinal direction of the nozzle, and the coatings discharged onto the substrate can be applied widthwise uniformly to the substrate with the aid of the flat surface. In other words, because the coating is discharged from the plurality of discharge openings having a longitudinally short dimension of length, it is possible to prevent the deformation of the discharge openings, and it is not necessary to limit the coating width to a small level, thereby enabling a wide coating. In addition, it is possible to provide a high quality coating having a uniform thickness.

The above and other objects, features and advantages of the invention will become apparent from a consideration of the following description of the preferred embodiments, taken in conjunction with the accompanying drawings.

DESCRIPTION OF THE PREFERRED EMBODIMENTS

The present invention will now be described by way of preferred embodiments in connection with FIGS. 1 to 8 of the accompanying drawings.

Figure 1:
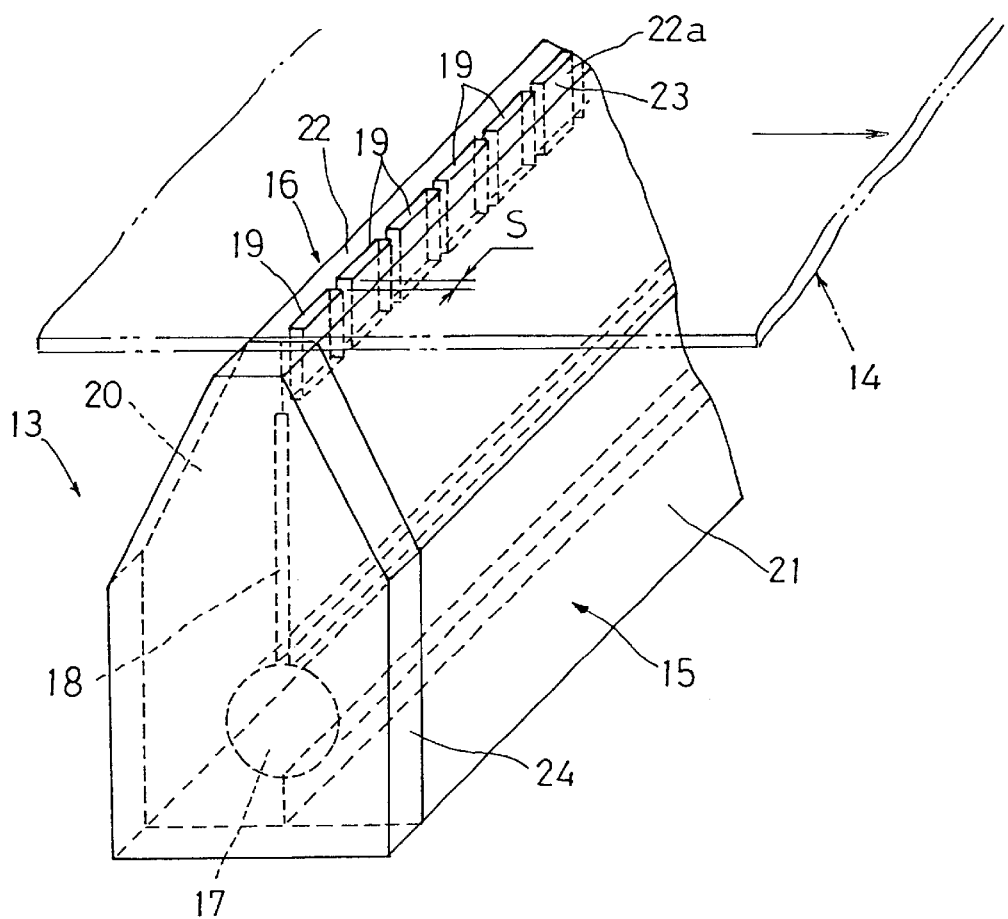
FIG. 1 is a perspective view o an essential portion of a first embodiment of a coating device according to the present invention.
Figure 2:
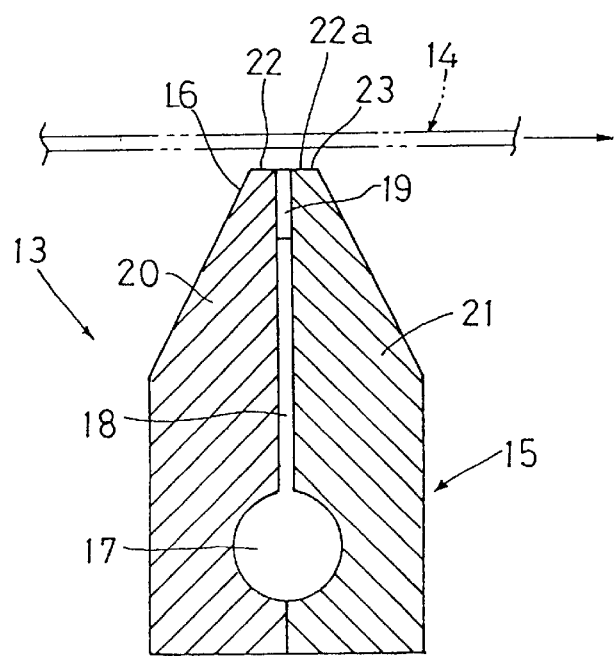
FIG. 2 is a longitudinal sectional view of the essential portion, taken in a travelling direction of a substrate.

FIG. 1 is a perspective view of an essential portion of a first embodiment of a coating device according to the present invention, and FIG. 2 is a longitudinal sectional view of the essential portion, taken in a travelling direction of a substrate.

Referring to FIGS. 1 and 2, a coating device 13 according to the present invention is formed into a substantially cubic shape with its tip end opposed to a wide proper continuous substrate 14 being narrowed in a wedged manner. The coating device 13 is disposed in such a manner that a longitudinal axis of a body 15 extends in a direction (a widthwise direction of the substrate) perpendicular to the travelling direction of the substrate 14 indicated by an arrow in FIGS. 1 and 2. A tip end of the body 15 opposed to the substrate 4 is provided with a nozzle 16 for applying a desire coating. Further, a substantially cylindrical reservoir 17 is provided in the body 15 to communicate with a suitable coating supply port. This reservoir 17 is defined to extend in a longitudinal direction of the body 15 and has a length corresponding to the width of the travelling substrate 14.

The reservoir 17 is provided with a slit-like communication groove 18 for supplying the coating in the longitudinal direction toward a tip end of the nozzle 16. At a terminal end of the communication groove 18, a plurality of coating discharge openings 19 of a suitable shape are provided between oppose surfaces of a back block 20 and a doctor block 21. The discharge openings 19 are arranged in a row at predetermined distances, e.g., 1 mm or less, spaced apart from one another in a longitudinal direction of the nozzle 16. It should be noted that the provision of the communication groove 18 and the discharge openings 19 is not limited to that in the illustrated embodiment. For example, the communication groove 18 and the discharge openings 19 may be provided in either one of the opposed surfaces of the back block 20 and the doctor block 21. In addition, the shape of the discharge openings 19 is particular y not limited to that in the illustrated embodiment, and the length of the discharge openings 19 in a direction of flowing of the coating may be as short as less than 10 mm.

A flat surface 23 of a proper length is formed at a tip end face 22a of the doctor block 21 located at least a portion, of a tip end face 22 of the nozzle 16 opposed to the substrate 14, which lies downstream in the travelling direction of the substrate 14. The flat surface 23 is adapted to permit the thickness of the coating discharged from the plurality of discharge openings 19 toward the substrate 14 to be uniformized in the widthwise direction of the substrate 14.

The mutually opposed surfaces of the back block 20 and the doctor block 21 are firmly secured to each other, for example, by adhesive bonding, bolting or clamping, and a suitable end member 24 is secured to each of longitudinally opposite ends of the body 15 to reliably prevent a leakage of the coating.

The shape of each of the components is not limited to that in the illustrated embodiment, and may be a shape which permits the coating supplied to the reservoir 17 to be passed through the communication groove 18 and discharged from the plurality of discharge openings toward the substrate 14.

The back block 20 and the doctor block 21 may includes corresponding abutments of a suitable shape (not shown) provided therein at suitable locations of the communication groove 18 for securing the back block 20 and the doctor block 21 to each other.

The body 15 of the coating device according to the present embodiment is divided into the back block 20 and the doctor block 21 for facilitating the machining, but the body 15 may be constructed monolithically. When the monolithic body 15 is used, the discharge openings 19 and the communication groove 18 may be made by any of various machining such as a chemical etching and an electrical discharge machining.

The operation of the first embodiment having the above-described construction will be described below with reference to FIGS. 1 to 3.

Figure 3:
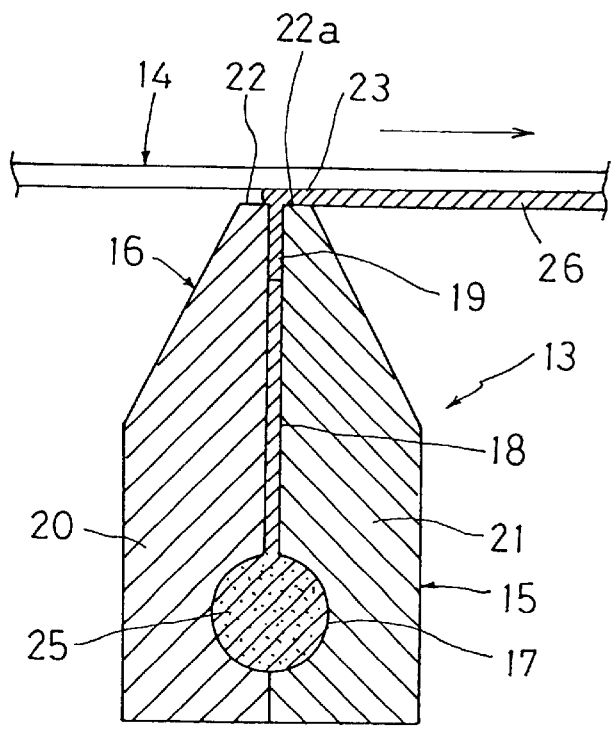
FIG. 3 is a view for explaining a coating state.

FIG. 3 is a view for explaining the coating state.

First, the substrate 14 is allowed to travel at a predetermined speed in the travelling direction indicated by the arrow in Figures by a suitable method which is not shown. In the coating device 13, the coating 25 (FIG. 3) is supplied into the reservoir 17 in the body 15 by a suitable supplying means (not shown) such as a pump or the like.

Then, the coating 25 supplied into the reservoir 17 in the body 15 is passed through the communication groove 18 and discharged from the discharge openings 19 toward the substrate 14, as shown in FIG. 3, so that it is applied to the substrate 14.

The coating 25 discharged from the discharge openings 19 toward the substrate 14 is gradually diffused, and when it is passed over the flat surface 23 provided on the doctor block 21 located downstream of the tip end face 22 of the nozzle in the travelling direction of the substrate 14 by the travelling movement of the substrate 14, it is easily smoothed by cooperation of the flat surface 23 with the surface tension of the coating 25 to form a coating film 26 having a thickness uniform in the widthwise direction of the substrate 14.

If the spacing S (FIG. 1) between the adjacent discharge openings 19 is decreased, the coating 25 discharged from the discharge openings 19 is permitted to flow in only a single stream connected longitudinally of the body 15 as a result of increasing of the sectional area of each of flow paths by a loss in pressure at a moment when it is discharged from the discharge openings 19.

With the coating device 13 having such construction according to the present invention, the discharge openings 19 for discharging the coating 25 to the substrate 14 are defined in a longitudinally short harmonica-like configuration, unlike the prior art longitudinally long slit 5. Therefore, when the coating 25 is discharged from the discharge openings 19, the discharge openings 19 can resist a deforming force of expanding the discharge openings 19 in a direction perpendicular to a flowing direction of the coating 25 by the pressure of the coating 25. In other words, it is possible to reliably prevent the deformation of the discharge openings 19.

Further, the coating 25 is discharged from the plurality of discharge openings 19 and therefore, the loss in pressure can be reduced, as compared with the prior art, thereby facilitating it to maintain the amount of coating discharged at a constant value.

Yet further, because the loss in pressure can be reduced by discharging the coating 25 from the plurality of discharge openings 19, it is possible to moderate the machining accuracy for the discharge openings 19, to shorten the machining time and to reduce the labor of quality control, leading to a reduced economical burden.

Thus, unlike the prior art coating device 1, it is possible for the coating device according to the present invention to provide a high coating quality without an adjustment of the discharge openings 19.

In this way, in the present embodiment, the discharge opening 19 is a mechanism which cannot be deformed at all and therefore, even in a hot melt system, the problem of a variation in opening width t is not arisen at all as in the prior art. Thus, a coating required to be heated, as is the case with a coating such as a gelatin-like coating, a UV coating and an EV coating, can be applied in an extremely satisfactory manner to the substrate by a hot melt system.

In the first embodiment, an upper surface of the substrate 14 which is not opposed to the coating device 13 is in a free state, but a backup roll (not shown) may be disposed on the upper surface of the substrate 14 and even in this case, a good coating operation may be carried out likewise.

With the coating device 13 of such construction according to the present invention, the need for a stopper (not shown) serving as an adjusting mechanism provided to maintain the prior art opening width accuracy is eliminated.

Figure 4:
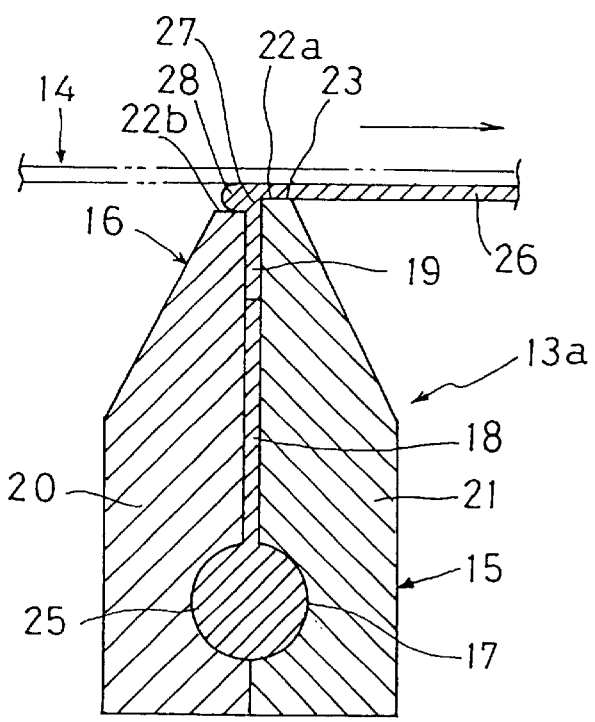
FIG. 4 is a perspective view of an essential portion of a second embodiment of a coating device according to the present invention.

FIG. 4 is a longitudinal sectional view illustrating a second embodiment of a coating device according to the present invention.

The coating device 13a of the second embodiment is constructed in such a manner that a tip end face located upstream in a travelling direction of a substrate 14 is disposed below a tip end face 22a having a flat surface 23 located downstream in the travelling direction of the substrate 14, as shown in FIG. 4. Other arrangements are the same as in the first embodiment.

Even with the coating device 13a of this embodiment having such construction, an effect similar to that in the first embodiment can be provided, and an accumulate 28 of the coating 25 is formed at a stepped portion 27 between the tip end face 22b located upstream in the travelling direction of the substrate 14 and the tip end face 22a located downstream in the travelling direction of the substrate 14, thereby making it possible to stabilize the coating performance of the coating 25 to the substrate.

Figure 5:
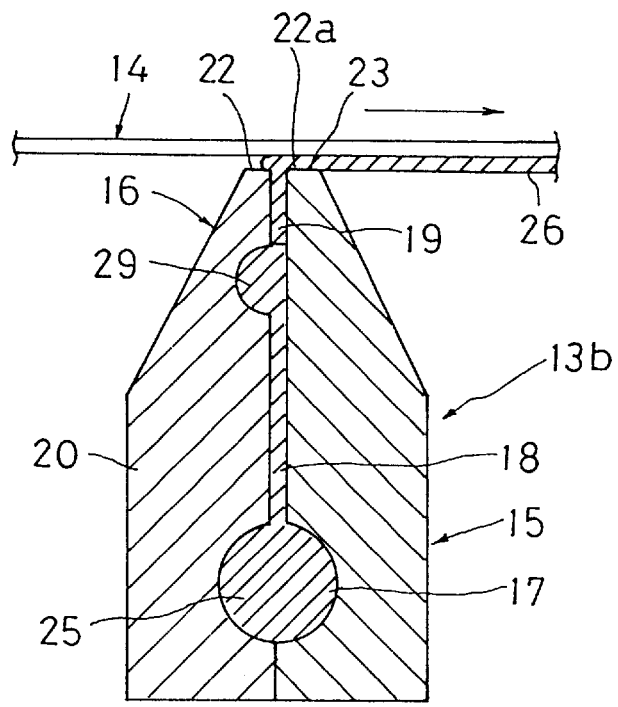
FIG. 5 is a perspective view of an essential portion of a third embodiment of a coating device according to the present invention.

FIG. 5 is a longitudinal sectional view illustrating a third embodiment of a coating device according to the present invention.

The coating device 13b of the third embodiment has a buffering groove 29 of a suitable shape provided in the vicinity of discharge openings 19 in a communication groove 18 to extend longitudinally of a body 15. Other arrangements are the same as in the previously-described first embodiment. It should be noted that the buffering groove 29 is particularly not limited to that in the illustrated embodiment and may be provided on each of the opposite sides of the communication groove 18.

Even with the coating device 13b of this embodiment having such construction, an effect similar to that in the first embodiment can be provided, and the buffering groove 29 serves as an accumulator, so that a pulsation of the liquid pressure of the coating 25 discharged from the discharge openings toward a substrate 14 can be absorbed to uniformize and stabilize such liquid pressure.

Figure 6:
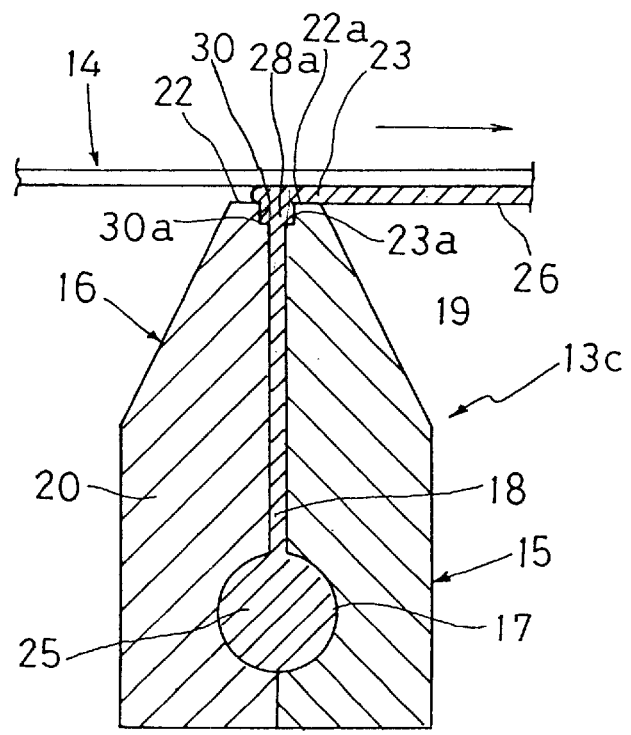
FIG. 6 is a perspective view of an essential portion of a fourth embodiment of a coating device according to the present invention.

FIG. 6 is a longitudinal sectional view illustrating a fourth embodiment of a coating device according to the present invention.

The coating device 13c of the fourth embodiment includes a recessed groove 30 provided in a tip end face 22 of a nozzle 16 in a body 15 opposed to a substrate 14 to extend in the widthwise direction of the substrate 14, and a plurality of discharge openings 19 provided at a bottom 30a of the recessed groove 30. Other arrangements are the same as in the previously-described first embodiment.

Even with the coating device 13c of this embodiment having such construction, an effect similar to that in the first embodiment can be provided, and an accumulate 28a of the substrate 14 substantially similar to that in the previously-described second embodiment is formed in the recessed groove 30, thereby stabilizing the coating performance of the coating 25 to the substrate 14.

Figure 7:
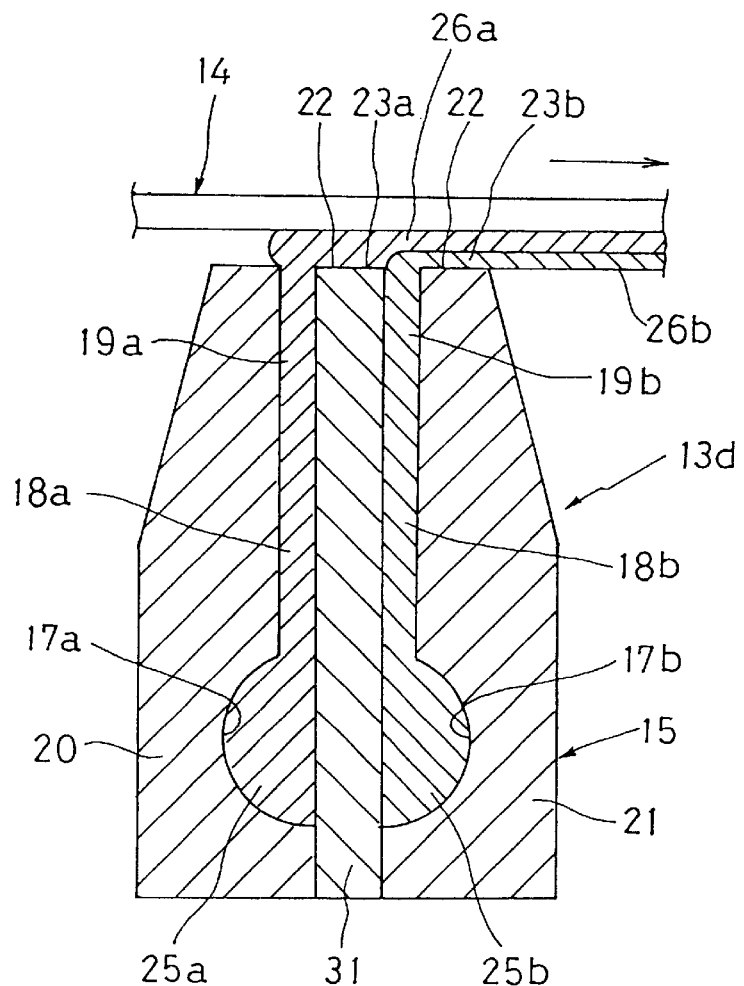
FIG. 7 is a perspective view of an essential portion of a fifth embodiment of a coating device according to the present invention.

FIG. 7 is a longitudinal sectional view illustrating a fifth embodiment of a coating device according to the present invention.

The coating device 13d of the fifth embodiment is suitable for applying two layers of coatings 25a and 25b onto a surface of a wide proper continuous substrate 14, as is the case with a magnetic tape of a multi-layer structure.

The coating device 13d of this embodiment has a body 15 including a back block 20, a central block 31 and a doctor block 21 which are arrange in sequence from an upstream side in the travelling direction of the substrate 14. Defined between the back block 20 and the central block 31 are a first reservoir 17a, a first communication groove 18a and a plurality of first discharge openings 19a, which are similar to those in the first embodiment and through which a first desired coating 25a is applied to the substrate 14. Defined between the central block 31 and the doctor block 21 are a second reservoir 17b, a second communication groove 18b and a plurality of second discharge openings 19b, which are similar to those in the first embodiment and through which a second desired coating 25b is applied to the substrate 14 in such a manner that it is superposed on the first coating 25a. A first flat surface 23a is formed on a tip end face 22 of the central block 31 opposed to the substrate 14 for permitting the coating 25a to be formed into a coating film 26a uniform in the widthwise direction of the substrate 14, and a second flat surface 23b is formed on a tip end face of the doctor block 21 opposed to the substrate 14 for permitting the coating 25b to be formed into a coating film uniform in the widthwise direction of the substrate 14. Opposed surfaces of the back block 20, the central block 31 and the doctor block 21 are firmly secured to one another by an adhesive bonding, a bolting or a clamping as in the previously-described first embodiment. Other arrangements are the same as in the first embodiment. More specifically the coating device 13d is constructed in such a manner that the discharge openings 19 similar to those arranged in the row in the longitudinal direction of the body 15 in the first embodiment are arranged in multiple rows, so that a multi-layer coating to the substrate 14 can be carried out.

With the coating device 13d of this embodiment, the first coating 25a supplied to the first reservoir 17a is passed through the first communication groove 18a and discharged from the first discharge openings 19a toward the substrate 14. When the first coating 25a applied to the substrate 14 is then passed over the first flat surface 23a of the central block 31 by the travelling of the substrate 14, it is easily smoothed by the first flat surface 23a to form a first coating film 26a uniform in the widthwise direction of the substrate 14. Further, the second coating 25b supplied to the second reservoir 17b is passed through the second communication groove 18b and discharged from the second discharge openings 18b. When the second coating 25b applied to the surface of the first coating 25a is then passed over the second flat surface 23b of the doctor block 21 by tie travelling of the substrate 14, it is easily smoothed by the second flat surface 23b to form a second coating film 26b uniform in the widthwise direction of the substrate 14. In this manner, a two-layer structure of the first and second coatings 25a and 25b superposed on each other is formed on the surface of the substrate 14. Even with the coating device 13d of such construction, an effect similar to that in the previously-described first embodiment is provided.

Figure 8:
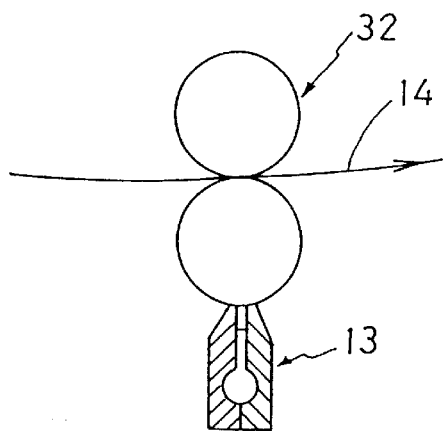
FIG. 8 is a schematic view illustrating an embodiment of a coating device according to th present invention, applied as a coating feeder of a gravure coating device.
Figure 9:
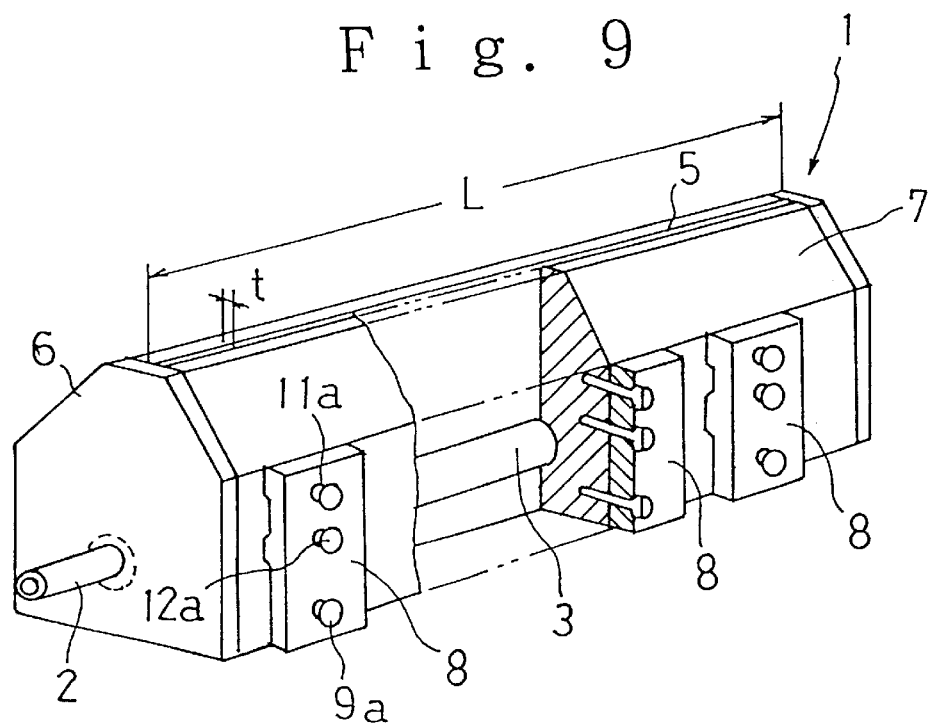
FIG. 9 is a partially cutaway perspective view of an essential portion of the prior art coating device.
Figure 10:
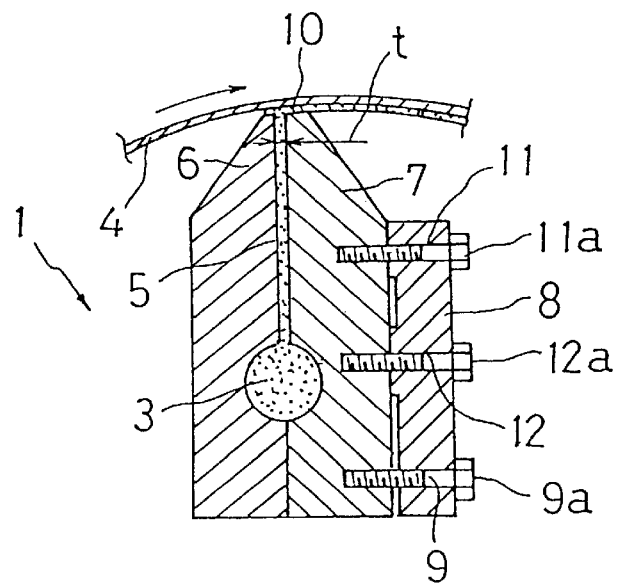
FIG. 10 is a longitudinal sectional view of the essential portion, taken in the travelling direction of a substrate in FIG. 9.

The coating device 13 according to the present invention is also applicable as a coating feeder of a gravure coating device 32 or the like, as shown in FIG. 8.

Further, the coating device 13 according to the present invention is applicable as coating device used in a curtain coating process.

It will be understood that the present invention is not limited to the above-described embodiments, and various modification and variations may be made without departing from the spirit and scope of the invention defined as set forth in claims. For example, the constructions of the embodiments can be used in combination.

What is claimed is:

1. Apparatus for applying coating under pressure to a surface of a traveling continuous web comprising;
   a. a longitudinally elongated feed block transversely disposed with respect to direction of web travel;
   b. said feed block having a base portion remote from said web and a taper portion more proximate said web;
   c. said feed block having a coating supply reservoir within said base portion and extending longitudinally substantially the length thereof;
   d. said taper portion tapering from said base portion towards said web and terminating in a tip portion proximate said web;
   e. said tip portion including a exterior surface which extends longitudinally the length of said tip portion and parallel with and facing said web;
   f. said feed block having a plurality of coating feed passageways terminating in apertures formed in said tip portion exterior surface, said apertures communicating with said reservoir via respective associated coating feed passageways serially disposed with a longitudinally elongated passageway in said feed block, wherein said passageway is a slit extending vertically from said reservoir to said apertures and wherein said feed block has a longitudinally extending buffering groove of enlarged longitudinal cross-section relative to said passageway intermediate said reservoir and said apertures.

2. Apparatus of claim 1 wherein said feed block has a generally parallelepiped configuration.

3. Apparatus for applying coating under pressure to a surface of a traveling continuous web comprising;
   a. a longitudinally elongated feed block transversely disposed with respect to direction of web travel;
   b. said feed block having a base portion remote from said web and a taper portion more proximate said web;
   c. said feed block having a coating supply reservoir within said base portion and extending longitudinally substantially the length thereof;
   d. said taper portion tapering from said base portion towards said web and terminating in a tip portion proximate said web;
   e. said tip portion including an exterior surface which extends longitudinally the length of said tip portion and parallel with and facing said web;
   f. said feed block having a plurality of coating feed passageways terminating in apertures formed in said tip portion exterior surface, said apertures communicating with said reservoir via respective associated coating feed passageways serially disposed with a longitudinally elongated passageway in said feed block, wherein said passageway is a slit extending vertically from said reservoir to said apertures and wherein said feed block has a longitudinally extending region of enlarged longitudinal cross-section relative to and communicating with said passageway for storing coating material intermediate said reservoir and said apertures.

4. Apparatus of claim 3 wherein said longitudinally extending region of enlarged longitudinal cross-section relative to and communicating with said passageway has semicircular cross section.

5. Apparatus for applying coating under pressure to a surface of a traveling continuous web comprising;
   a. a longitudinally elongated feed block transversely disposed with respect to direction of web travel;
   b. said feed block having a base portion remote from said web and a taper portion more proximate said web;
   c. said feed block having a coating supply reservoir within said base portion and extending longitudinally substantially the length thereof;
   d. said taper portion tapering from said base portion towards said web and terminating in a tip portion proximate said web;
   e. said tip portion including an exterior surface which extends longitudinally the length of said tip portion and parallel with and facing said web;
   f. said feed block having a plurality of coating feed passageways terminating in apertures formed in said tip portion exterior surface, said apertures communicating with said reservoir via respective associated coating feed passageways serially disposed with a longitudinally elongated passageway in said feed block, wherein said passageway is a slit extending vertically from said reservoir to said apertures and wherein said feed block has upstream and downstream portions abutting to define said longitudinally elongated passageway and said reservoir therebetween.

6. Apparatus for applying a liquid coating under pressure to a surface of a traveling continuous web comprising:
   a. a longitudinally elongated feed block transversely disposed with respect to direction of web travel;
   b. said feed block having a base portion remote from said web and a taper portion more proximate said web;
   c. said feed block having a plurality of coating supply reservoirs within said base portion and extending longitudinally substantially the length thereof;

d. said taper portion tapering from said base portion towards said web and terminating in a tip portion proximate said web;

e. said tip portion including an exterior surface which extends longitudinally the length of said tip portion and parallel with and facing said web;

f. said feed block having pluralities of apertures formed in said tip portion exterior surfaces, respective pluralities of said apertures communicating with respective ones of said reservoirs via respective longitudinally elongated passageways in said feed block.

7. Apparatus of claim 6 wherein said feed block is inboard of said tip portion exterior surface respecting said web.

8. Apparatus for applying a liquid coating under pressure to a surface of a traveling continuous web having width in the range of from about 0.5 to about 3.0 meters, comprising:

a. a longitudinally elongated feed block transversely disposed with respect to direction of web travel;

b. said feed block having a base portion remote from said web and a taper portion more proximate said web;

c. said feed block having a coating supply reservoir within said base portion and extending longitudinally substantially the length thereof, said reservoir having a circular longitudinal cross-section;

d. said taper portion tapering from said base portion towards said web and terminating in a tip portion proximate said web;

e. said tip portion including an exterior surface which extends longitudinally the length of said tip portion and parallel with and facing said web;

f. said feed block being of generally parallelepiped configuration, positioned inboard of said tip portion exterior surface respecting said web and having a plurality of coating feed passageways terminating in parallel, rectangular longitudinally aligned apertures which are longer in the longitudinal direction than in the direction of web travel, which are formed in said tip portion exterior surface and bisect said surface, said apertures communicating with said reservoir via respective associated coating feed passageways serially disposed with a longitudinally elongated slit-like vertical passageway in said feed block, said tip portion surface extending from said apertures in the direction of web travel and oppositely thereto, said feed block including a longitudinally extending region of enlarged longitudinal cross-section relative to and communicating with said slit-like passageway for storing coating material intermediate said reservoir and said apertures.

\* \* \* \* \*